Jan. 5, 1932.  B. F. ANDRE  1,839,724
GRATE
Filed Oct. 4, 1930   3 Sheets-Sheet 1
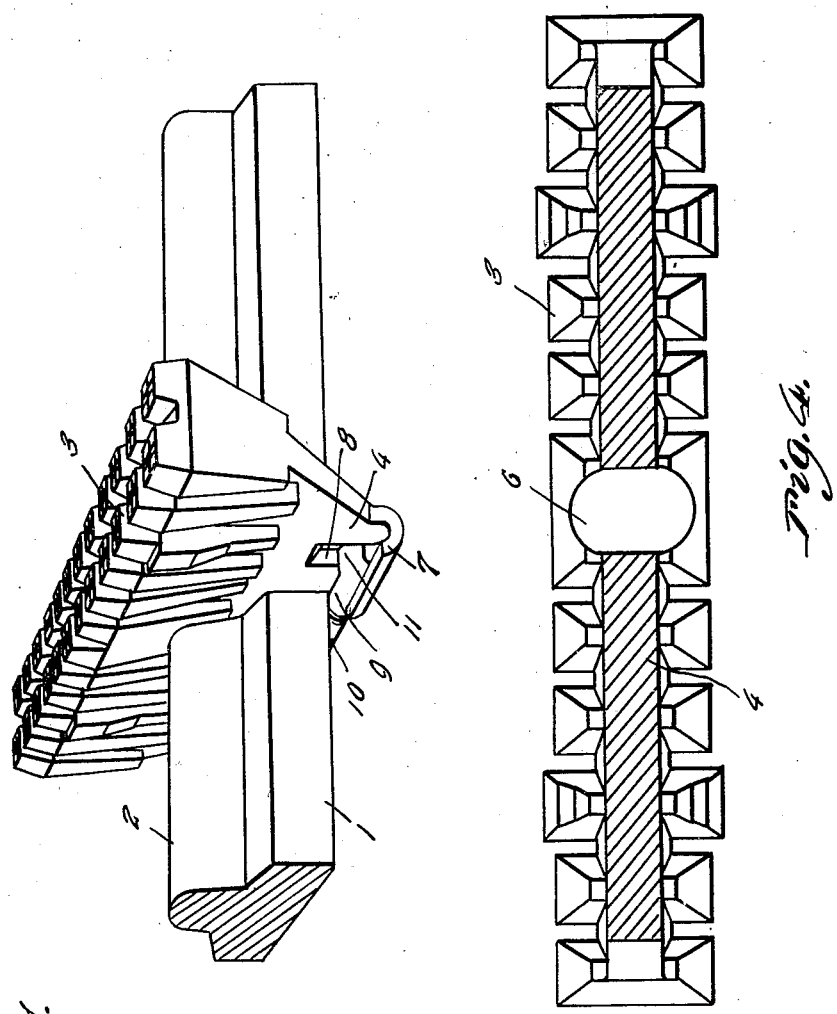
Inventor
*B. F. Andre*
By *Clarence A. O'Brien*
Attorney

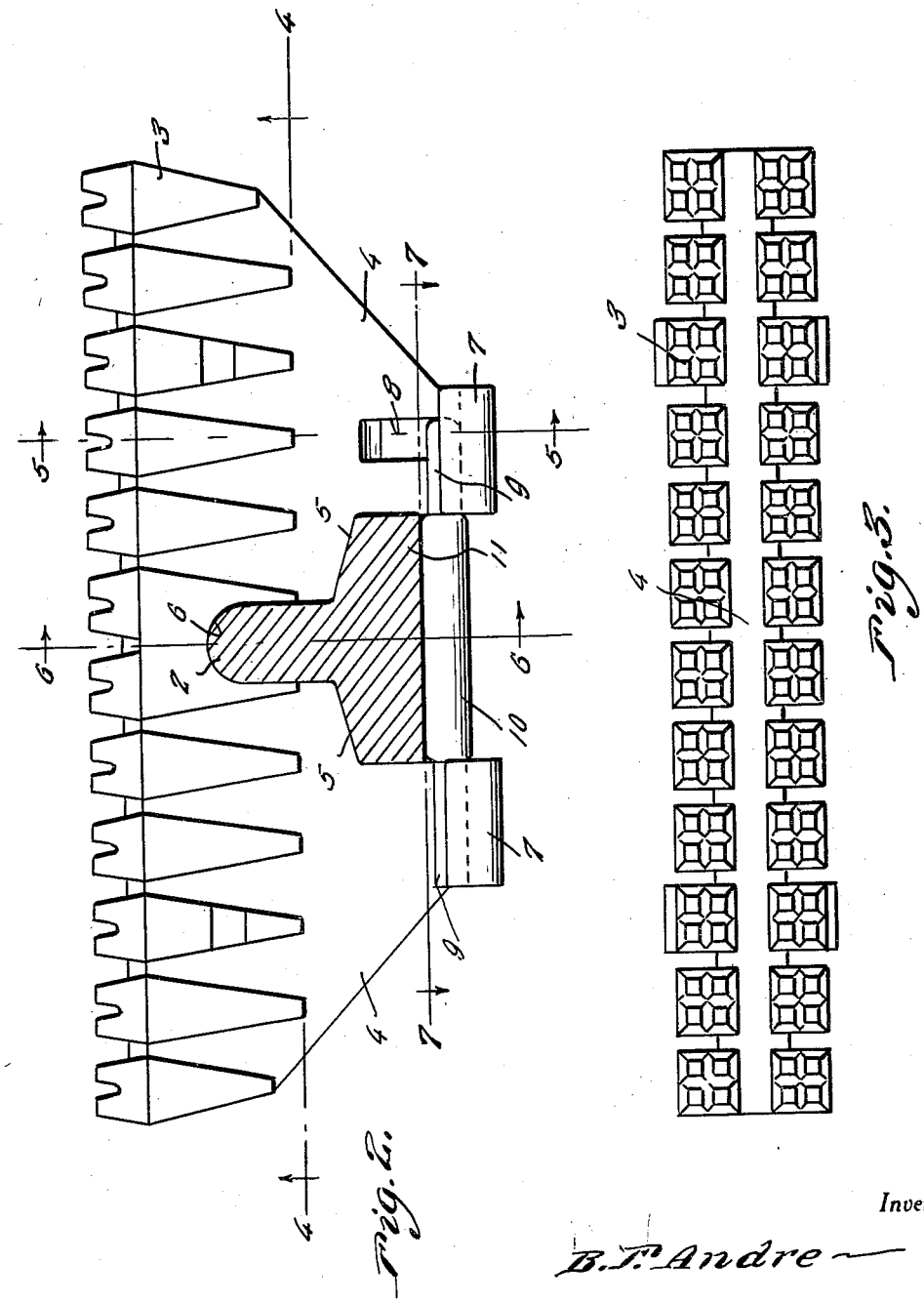

Jan. 5, 1932.    B. F. ANDRE    1,839,724
GRATE
Filed Oct. 4, 1930    3 Sheets-Sheet 3
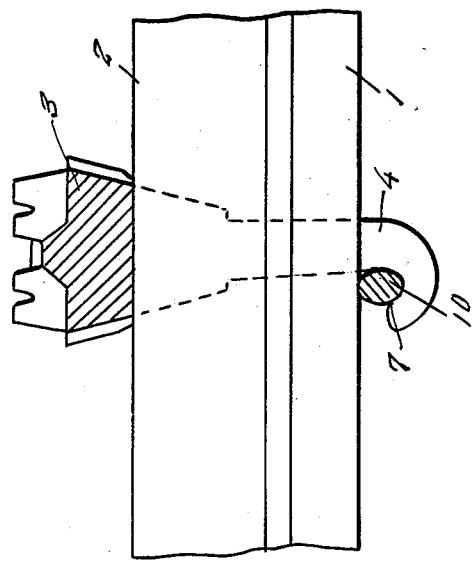
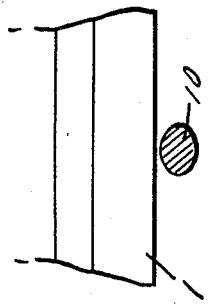
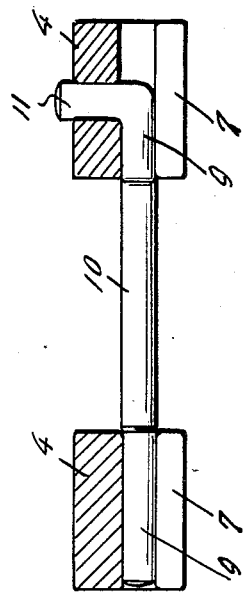
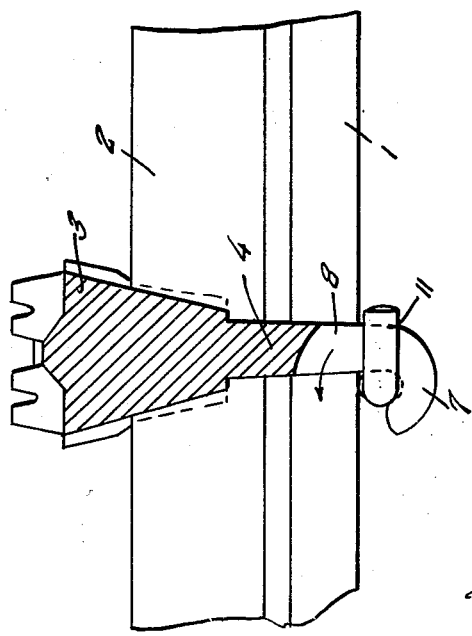
Inventor
*B. F. Andre*
By *Clarence A. O'Brien*
Attorney